J. W. PFOST.
DANGER SIGNAL.
APPLICATION FILED DEC. 18, 1918.

1,305,930.

Patented June 3, 1919.
3 SHEETS—SHEET 1.

Witness
M. D. Slifer

Inventor
J. W. Pfost
By Victor J. Evans
Attorney

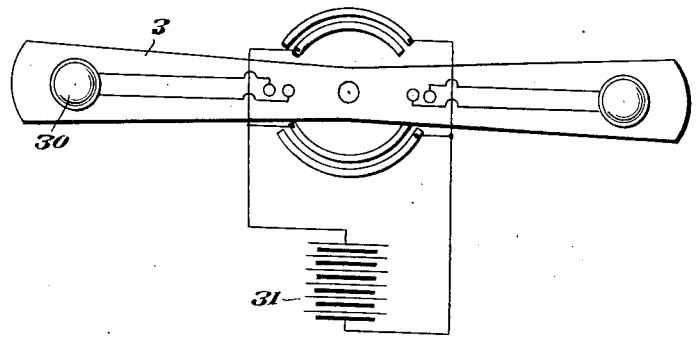
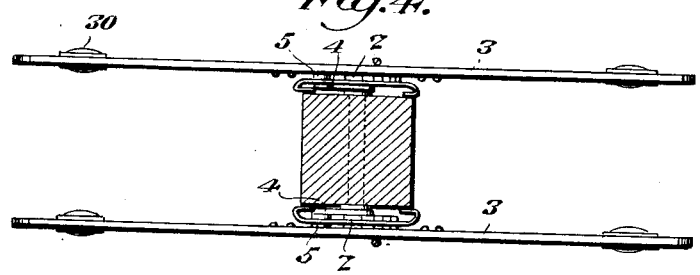
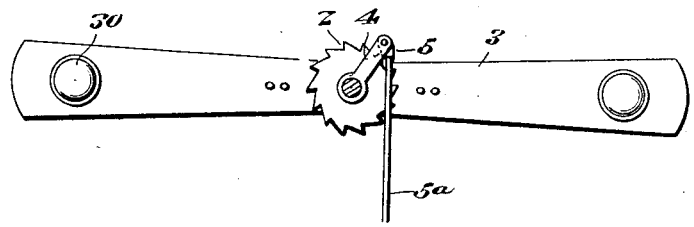

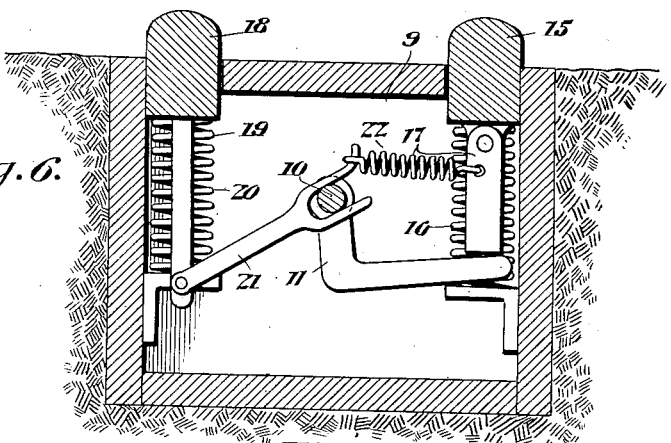
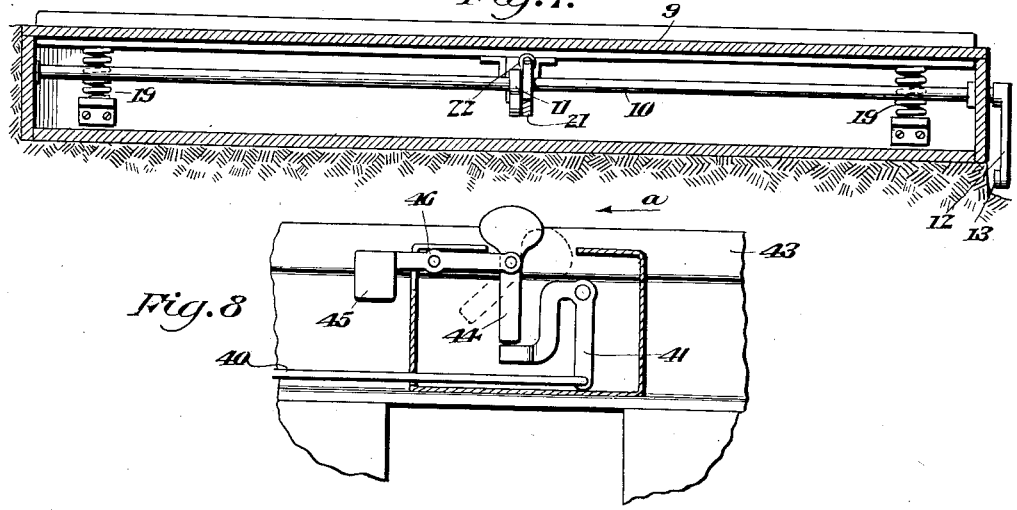
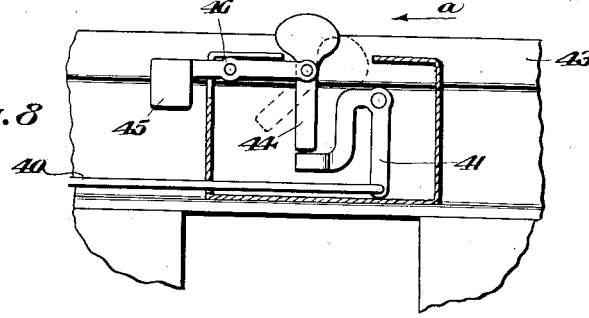
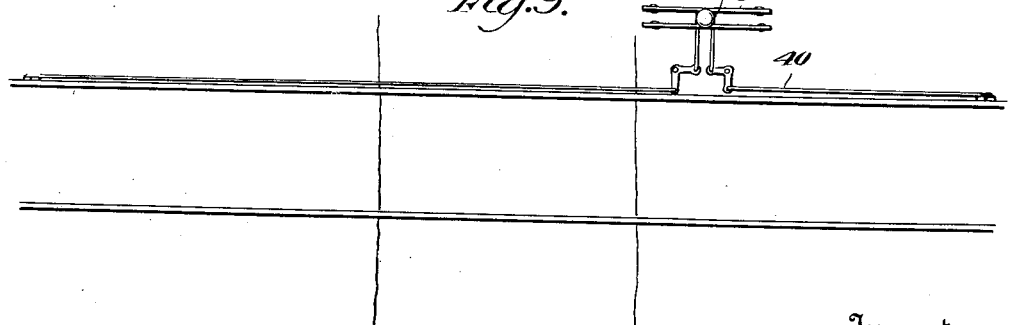

UNITED STATES PATENT OFFICE.

JOHN W. PFOST, OF BULWINKLE, CALIFORNIA.

DANGER-SIGNAL.

1,305,930.  Specification of Letters Patent.  Patented June 3, 1919.

Application filed December 18, 1918. Serial No. 267,286.

*To all whom it may concern:*

Be it known that I, JOHN W. PFOST, a citizen of the United States, residing at Bulwinkle, in the county of Humboldt and State of California, have invented new and useful Improvements in Danger-Signals, of which the following is a specification.

My present invention pertains to danger signals of the kind that are adapted to be operated from a distant point by the passage of an automobile, a locomotive or any other vehicle.

One of the objects of my invention is to provide signal members adapted to be set up at a dangerous turn in a road and connected with actuating mechanism disposed in the road at opposite sides of the turn and each about 265 feet from the turn; each actuating mechanism being so constructed and arranged that it will be put into operation by an automobile approaching the turn but will not be operated by an automobile moving in a direction away from the turn.

Another object of my invention is the provision of an installation adapted for use in conjunction with railway crossings to apprise drivers and pedestrians of the approach of a train; the said installation embodying the same principle as the embodiment first alluded to so that the danger signal at the crossing will be actuated by a train approaching the crossing but will not be actuated by a train receding from the crossing.

Another object of the invention is the provision of means whereby the signal members are rendered visible in the dark with a view to assuring the effectiveness of the signal in the night as well as in the day.

Other objects and advantages of the invention will be fully understood from the following description and claims when the same are read in connection with the drawings, accompanying and forming part of this specification, in which:

Figure 1:
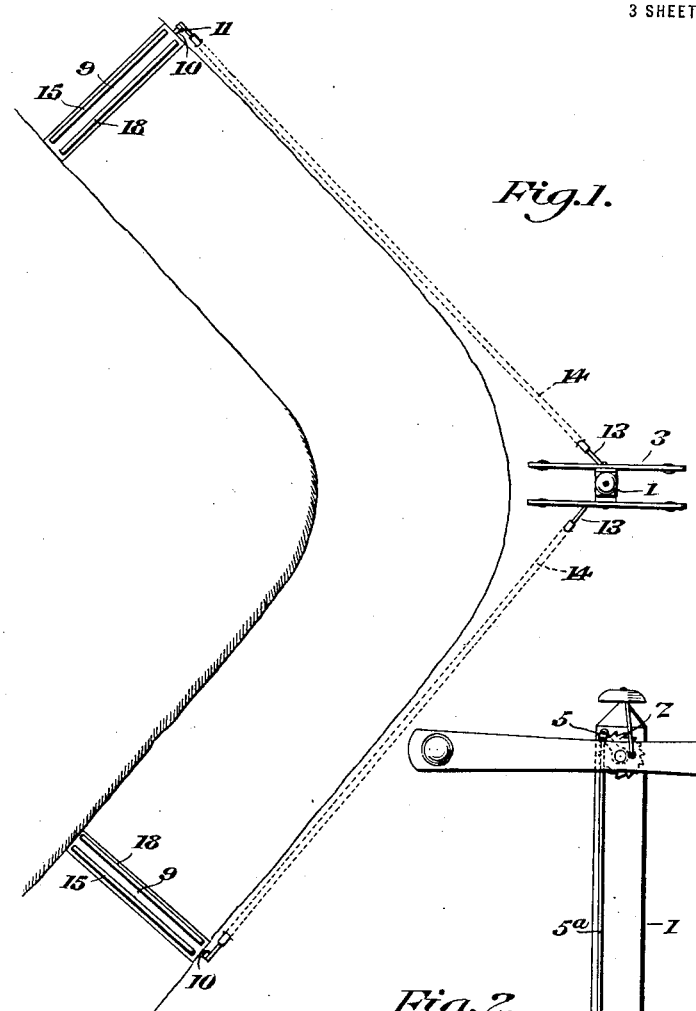
Figure 1 is a general view illustrating the installation of my invention at a sharp or dangerous curve in a highway.
Figure 2:
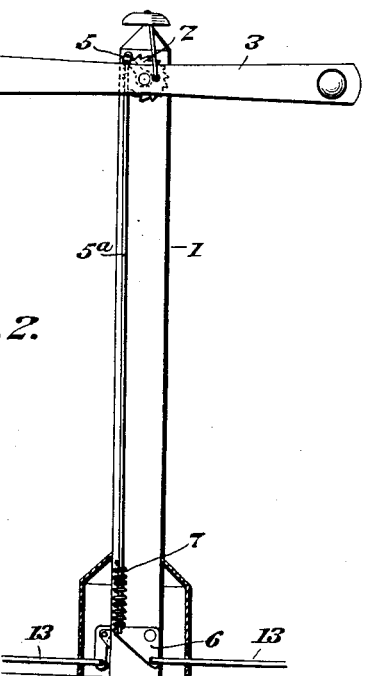
Fig. 2 is an elevation of the signal located at the turn.

Fig. 3 is a detail view showing the manner in which the signal arms are illuminated at night, Figs. 4 and 5 are detail sections showing portions of the mechanism comprising the signal, Figs. 6 and 7 are detail views of the actuating mechanism complementary to the signal, Fig. 8 is an enlarged detail view showing a modification of my novel actuating mechanism as arranged relative to a railway rail for the operation of a signal arm or semaphore at a railway crossing, Fig. 9 is a view showing the general arrangement of the signal apparatus as a whole with reference to a railway crossing.

Similar numerals of reference designate corresponding parts in Figs. 1 to 7 to which reference will first be had.

In carrying out the highway traffic signal part of my invention I arrange at a prominent point adjacent to a dangerous turn or curve an upright post 1, and on the said post I mount ratchets 2, bearing semaphores or arms 3. I also provide as a complement to each arm 3 a lever 4, equipped with a pawl 5. Each of these levers 4 is connected to a rod 5ª which is carried downwardly to a point near the surface of the ground where it is suitably connected with a bell crank 6 and is also connected to a lifting spring 7. One of the arms 3 is for actuation by an automobile approaching the turn from one direction and the other arm 3 is for actuation by an automobile approaching the turn from the opposite direction.

Located in the roadway at points at opposite sides of the curve or turn in the highway are the actuating mechanisms, complementary to the arms 3; there being one actuating mechanism for each arm, and the said mechanisms being adapted to operate each independently of the other. The actuating mechanisms are identical in construction and therefore a detailed description of the one shown in Figs. 6 and 7 will suffice to impart a definite understanding of both. The said mechanism of Figs. 6 and 7 comprises a casing 9 adapted to be disposed in the roadway and substantially flush with the surface thereof, a rock shaft 10 journaled in suitable bearings in said casing and having a crank 11 and also having an angularly disposed arm 12 (the latter connected through a rod 13 extending through an underground conduit 14 with the bell crank 6 of the rod 5ª of the complementary signal), an actuating trigger member 15 arranged in the casing 9 and normally extending above the surface of the highway, resilient means 16 yieldingly supporting said trigger member, a pendent controlling member 17 pivotally connected to the trigger member 15, a supplemental trigger member 18 normally supported by resilient means 19 above the surface of the roadway, a rod 20 connected to and depending from said member 18, a lever 21 connected to said rod, and an interposed connection 22 between the said lever and the controlling member 17.

The scheme of my invention contemplates the arranging of the trigger member 15, Fig. 1, at the opposite side of the supplemental trigger member 18, with reference to the signal at the dangerous turn in the highway.

By virtue of this provision the semaphore complementary to the particular actuating mechanism will be rotated when an automobile approaching the turn passes over and depresses the trigger member 15, this being due to the normal interposition of the controlling member 17 between the trigger member 15 and the crank 11 on the shaft 10. The crank 11 and the shaft 10 will not be actuated by an automobile approaching the actuating mechanism from the direction of the dangerous curve or turn. In other words an automobile arriving at the actuating mechanism after negotiating the curve or turn will not operate the signal behind it. This is due to the fact that the said automobile will first pass over and depress the trigger member 18 and quickly thereafter will pass over and depress the trigger member 15. When the trigger member 18 is depressed as stated the controlling member 17 will be drawn from its pendent position, and before said controlling member can return to said position through the action of gravity the automobile will have depressed and passed clear of the trigger member 15.

Manifestly this last named depression of the trigger member 15 will be an idle one inasmuch as the controlling member 17 will be out of position to impart movement to the crank 11 and the shaft 10. This provision for preventing operation of the mechanism by automobiles moving away from the signal at the turn or curve is materially advantageous inasmuch as it prevents unnecessary operation of the mechanism and in that way tends to prolong the usefulness of the apparatus as a whole.

In the operation of the embodiment thus far described in detail it will be readily apparent that when an automobile approaches the turn in one direction it will by depressing a trigger member 15, rotate one of the arms or semaphores 3, and in that way will apprise a driver approaching the turn from the opposite direction of its presence. In this way each driver will be put on notice at a considerable distance from the dangerous turn or curve, and hence the liability of accident through collision or otherwise will be practically eliminated.

In order to render the semaphores 3 effectual in the dark I prefer to provide each semaphore with an incandescent lamp 30 and I also provide a battery or other source of electrical energy 31. I further provide electrical connections and terminals complementary to the lamps 30 and the source of energy 31 and so constructed and arranged that the lamps 30 will be idle except when their respective arms 3 are rotated. Upon rotation, however, of either arm 3 the filament in the lamp 30 thereof will be caused to glow and in that way the arm 3 will be illuminated and notice will be attracted thereto so that as a matter of fact the signal will be more prominent at night than in the day.

The rotation of either semaphore 3 will be gradually stopped, after an operation, by the engagement of the pawl 5 with the ratchet 2, and generally, because of the balancing of the semaphore 3, it will assume the position shown in Fig. 3 with the terminals of the wires on the semaphore out of contact with the terminals complementary to the source of energy. It is immaterial, however if the lamps 30 glow while the semaphore is at rest, inasmuch as it is the rotation of the semaphore that is designed to apprise an automobile approaching a turn of the presence of another automobile approaching the turn from the opposite direction.

In the modification of my invention shown in Figs. 8 and 9 and designed more particularly for use in conjunction with a railway crossing, a post or upright 1 is located at the crossing and provided with a rotatable semaphore or arm 3, having fixed thereto a ratchet 2, with which is engaged a pawl 5 on a lever arm 4. The said lever arm 5 is connected to a rod 5ª, which at its lower end is connected with a bell crank 6, and is equipped with a lifting spring 7. The bell crank 6 is connected to a rod 40, which extends to a point remote from the crossing and is there connected to one arm of a bell crank 41. The said bell crank 41 is disposed in a casing 42, arranged in fixed relation alongside of and adjacent to one of the railway rails 43.

In order to assure operation of the bell crank 41 by a train traveling in the direction of the arrow (a) and prevent the operation of the said bell crank by a train traveling in the opposite direction, I prefer to employ the mechanism which will now be described. The said mechanism comprises a trigger member 44, and a weighted member 45, fulcrumed at 46 and carrying the pivoted trigger member 44 on its inner arm. A train moving in the direction of the arrow will depress the member 44 and through the medium of the same will rock the bell crank 41 about its axis and thereby actuate the signal at the crossing. When, however, a train moving in the direction opposite to that indicated by the arrow approaches the actuating mechanism, the said train will swing the member 44 to the position shown by dotted lines, so that depression of said member 44 will not be attended by movement of the bell crank 41. After the train passes however, the parts of the actuating mechanism will be restored to the positions shown so that a train in approaching the crossing in the first-named direction will depress the trigger member 44 and actuate the signal.

The semaphore or arm at the railway crossing may, when deemed expedient, be illuminated in substantially the same manner as the semaphores employed at a dangerous curve in a highway.

With reference to the embodiment of my invention shown in Figs. 8 and 9 I would have it understood that I prefer in the case of a double track railway to provide an equipment for each track so as to furnish notice at the crossing in the event of a train approaching the crossing on either track.

In both embodiments of my invention, the semaphores or arms 3 will rotate under the initial impulse until they are caused by gravity to come to a stop.

While I have specifically described the driving connection that I prefer to employ for transmitting rotary movement to each semaphore or signal arm 3 because of the simplicity and reliability of the said driving connection, I do not desire to be understood as confining myself to the disclosed construction of the driving connection *per se* inasmuch as any other mechanical driving connection may be employed without involving departure from the scope of my appended claims.

Having described my invention what I claim and desire to secure by Letters-Patent is:

1. In a signal installation, the combination of a movable signal, and an organized signal actuating mechanism located at a point remote from the signal; the said organized mechanism comprising a movable element connected with the movable signal and adapted to actuate the latter, two trigger members, and controlling means actuatable by one of the trigger members; the said controlling means being constructed and arranged to normally rest between one trigger member and the element that is connected with the signal, and being connected with the other trigger member, whereby when the latter trigger member is first actuated the controlling means will be displaced to prevent operation of the other trigger member from being attended by movement of the movable element.

2. In a signal apparatus the combination of a movable signal and a signal actuating organized mechanism, the said organized mechanism comprising a movable element connected with the movable signal, trigger members, and a movable controlling member connected with one of the trigger members and normally resting in and adapted to be yieldingly returned to a position between the other trigger member and the movable element.

3. In a signal apparatus, the combination of a movable signal, and an organized signal actuating mechanism; the said mechanism comprising a casing, a movable element disposed in said casing and connected with the movable signal to actuate the latter, trigger members movable in the casing and projecting above the same, a controlling member connected with one of the trigger members, and a spring normally retaining the controlling member in and adapted to return the same to a position between the other trigger member and the movable element.

4. In a signal apparatus, the combination of a movable signal, and an organized signal actuating mechanism; the said mechanism comprising a casing located at a point remote from the movable signal, a movable element disposed in said casing, a driving connection intermediate said movable element and the movable signal for actuating the latter by the former, vertically movable triggers mounted in the casing and normally projecting above the same to be engaged by the wheels of vehicles, a controlling element movable to and from a position between one of the triggers and the movable element, a connection between the controlling element and the other trigger, and means for normally maintaining the controlling element in and returning it to the said position.

5. In a signal apparatus, the combination of a movable signal and an organized signal actuating mechanism located at a point remote from the signal; the said mechanism comprising a movable element connected with the signal, trigger members, a controlling member constructed and arranged in one position to transmit motion from one trigger member to the movable element and in another position to permit of movement of said trigger member, without movement of the movable element, and a connection between the other trigger member and the controlling member whereby when said trigger member is first actuated, the controlling member will be positioned to prevent the transmission of motion from the first named trigger member to the movable member.

6. In a signal apparatus, the combination of a movable signal, means for illuminating the signal when the same is moved, and an organized signal actuating mechanism located at a point remote from the movable signal and comprising a movable element connected with the signal, trigger members, a controlling member constructed and arranged in one position to transmit motion from one trigger member to the movable element and in another position to permit of movement of the trigger member without movement of the movable element, and a connection between the controlling member and the other trigger lever whereby when the latter is actuated the controlling member will be moved into the last named position.

7. In a signal apparatus the combination of a movable signal and an organized signal actuating mechanism located at a point remote from the movable signal; the said organized mechanism comprising two trigger members arranged close to each other whereby one will be operated by passing vehicles immediately after the operation of the other, a movable element connected with the signal, and movable controlling means normally interposed between one of the trigger members and the movable element and connected with and movable by the other trigger member.

8. In a signal apparatus, the combination of an upright located at a dangerous turn in a highway, a movable signal on said upright, a casing countersunk in the highway, and an organized mechanism carried by said casing and comprising a rock shaft connected with the signal, a lever arm on said rock shaft, transversely disposed spring supported triggers connected with the casing to project above the surface of the highway, said triggers being arranged close together, a pendent controlling member pivoted to one trigger and normally resting in upright position between the same and the arm on the rock shaft, and a connection between the other trigger and said controlling member for moving said member out of its upright position when said trigger is depressed.

9. In a signal apparatus, the combination of a movable signal located at a turn in a highway, and an organized signal actuating mechanism arranged in the highway at a point remote from the movable signal; the said actuating mechanism comprising a movable element connected with the movable signal, trigger members, movable controlling means normally positioned to transmit downward movement of one trigger member to the movable element, and a connection between said controlling means and the other trigger member whereby depression of the latter will be attained by movement of the controlling means into idle position.

10. In a signal apparatus, the combination of a movable signal, a movable element located remote from and connected with the signal, a movable trigger member arranged to move the movable element when actuated by a vehicle moving in one direction, and movable means whereby the trigger member leaves the movable element at rest when said trigger member is actuated by a vehicle moving in the opposite direction.

In testimony whereof I affix my signature.
JOHN W. PFOST.